Feb. 21, 1956 W. R. SMEDLEY ET AL 2,735,596
DEVICE FOR HOLDING A FISHING POLE
Filed May 24, 1954
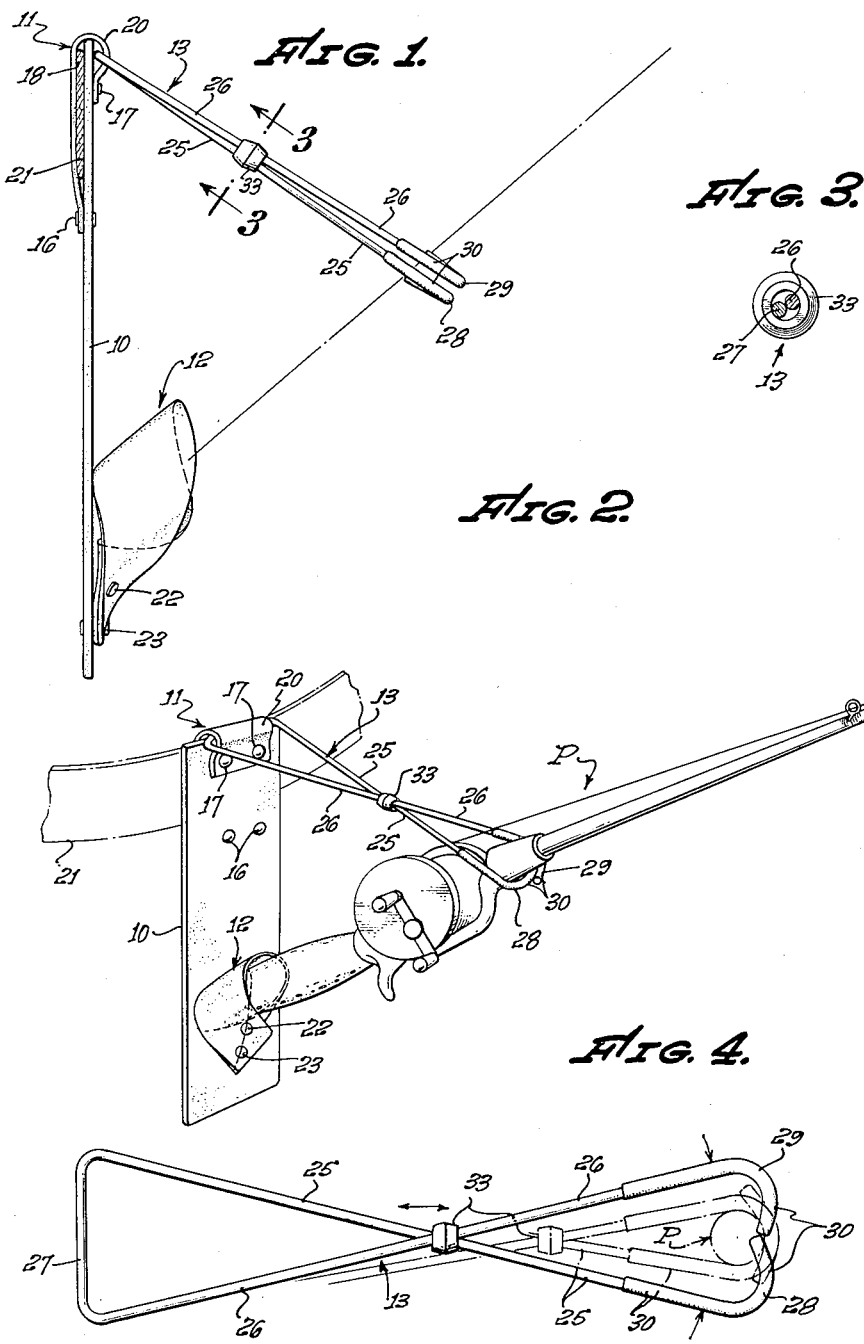
INVENTORS.
WILEY R. SMEDLEY,
CLAUDE C. SMEDLEY,
BY
ATTORNEY.

United States Patent Office 2,735,596
Patented Feb. 21, 1956

2,735,596
DEVICE FOR HOLDING A FISHING POLE

Wiley R. Smedley and Claude C. Smedley, El Monte, Calif.

Application May 24, 1954, Serial No. 431,772

4 Claims. (Cl. 224—5)

This invention relates to a device to be worn by a fisherman to hold a fishing pole in an effective upright position. Such a device relieves the fisherman of the burden of holding the pole by hand in those instances when he needs both hands free. A device of this type consists essentially of an upright base member adapted to be supported by the fisherman's body, a socket on the base structure to seat the butt end of a fishing pole and means releasably engageable with the fishing pole at a point spaced from the socket to hold the fishing pole inclined forward at a desirable angle.

While such a base structure may be adapted in any suitable manner for support from the fisherman's body, an object of the preferred practice of the invention is to provide simplified means for this purpose. This object is attained by providing the base member with means such as a simple loop member for releasable engagement with the fisherman's belt.

It is a further object of the invention to provide a simple, efficient and conveniently operable means to hold the fishing pole in the socket at the desired inclined angle in a releasable manner and to prevent the fishing pole from rocking laterally to any substantial degree about its pivotal support in the socket. In this regard a feature of the invention is the attachment of releasable pole-engaging means to the base structure by a hinge construction having a substantially horizontal transverse axis. Such a hinge construction confines the relative movement of the releasable means to an arc in a substantially vertical plane and thereby holds the inclined pole against lateral pivotal movement in the socket.

A further feature of the invention in this regard is the provision of such a hinged releasable pole-engaging means in the form of a pair of crossed spring wire arms. The crossed wire arms are formed with hooks at their outer ends that are turned towards each other to engage the pole from opposite sides at the desired inclined angle of the pole. The two spring wire arms are biased to seek closed positions but may be separated manually when desired.

In this regard the preferred practice of the invention is characterized by the provision of a simple ring member encircling the two spring arms in the region of their intersection. To open the two spring arms it is merely necessary to shift this ring longitudinally against the yielding resistance of the two intersecting arms.

The various features and advantages of the invention may be understood from the following detailed description considered with the accompanying drawings.

In the drawings, which are to be regarded as merely illustrative:

Fig. 1 is a side elevation of the presently preferred embodiment of the invention;

Fig. 2 is a perspective view of the device as employed for holding a fishing pole;

Fig. 3 is an enlarged section taken as indicated by the line 3—3 of Fig. 2.

Fig. 4 is a plan view of the hinged means for releasably engaging the fishing pole.

The principal parts of the present embodiment of the invention are: a base member 10; loop means, generally designated by numeral 11, for attaching the base member to the user's belt; a socket member 12 on the base member for seating the butt end of a fishing pole; and means, generally designated by numeral 13, to releasably engage the fishing pole at a point spaced from the butt end of the pole. It will be apparent to those skilled in the art that such a combination may take various forms.

The base member 10 may take the form of an elongated rectangular plate member. Preferably the plate member is relatively stiff and for this purpose suitable plastic material with imbedded fabric reinforcement may be employed. Such a plate member may be adapted for suspension from the user's belt in any suitable manner. In the present construction, for example, the loop means 11 comprises a short strip of leather anchored at its lower end to the back of the base member 10 by suitable rivets 16. The strip of leather is folded over the top edge of the base member 10 as shown in Fig. 1 and the second end of the leather strip is secured to the front of the base member by a pair of spaced rivets 17. It is contemplated that the piece of leather will be drawn snugly across the top edge of the base member 10 so that the top edge of the base member cooperates with the strip of leather to form a loop 18 at the back of the base member and a shorter loop 20 at the front of the base member. The advantage of this construction is that the single piece of leather not only serves its primary purpose in forming the loop 18 to engage a belt 21 but also in forming the second loop 20 serves as a hinge means for the releasable pole-engaging means 13.

The socket member 12 preferably comprises simply a strip of leather looped back on itself with overlapping ends lying against the base member 10. A first rivet 22 extends through the overlapping ends of the leather strip to hold the leather in the desired loop configuration and a second rivet 23 extends through both of the overlapping ends of the leather strip as well as through the base member 10 to anchor the socket member in place. It will be noted in Figs. 1 and 2 that the axis of the more or less cylindrical loop formed by the leather strip is inclined upwardly and forwardly from the base member 10 at approximately the desired angle of inclination of a fishing pole.

The pole-engaging means 13 for releasably engaging a fishing pole at a point spaced from the butt end of the pole for cooperation with the socket means 12 in holding the fishing pole at a desired angle comprises, preferably, a piece of wire having the general character of spring wire. The single piece of wire is bent to form two overlapping arms 25 and 26 interconnected by an intermediate portion 27 for cooperation with the forward leather loop 20. As best shown in Fig. 2 the intermediate portion 27 of the wire extends through the forward leather loop 20 to provide a hinge construction that confines the pivotal movement of the releasable pole-engaging means 13 to an upright plane. Thus the releasable pole-engaging means 13 tends to prevent lateral movement of the fishing pole at whatever angle of inclination the fishing pole is held.

The outer ends of the two arms 25 and 26 are formed into hooks 28 and 29, respectively, which are turned towards each other to engage a fishing pole from opposite sides. Preferably the hook portions of the two arms are provided with sleeves 30 of plastic material which not only thicken the hooks to increase the areas in pressure contact with the pole but also provide desirable frictional or non-slipping contact with the pole. It is contemplated that the two resilient arms 25 and 26 will be normally biased towards their closed positions for holding a fishing pole so that it will be necessary to separate the two arms manually to release the fishing pole. In this regard a feature of the invention is the addition of a ring member 33 that slidingly encircles the two arms 25 and 26 in their region of intersection.

The normal biased positions of the two resilient arms 25 and 26 in the absence of engagement with a fishing pole is shown in full lines in Fig. 4. It will be noted that the two hooks 28 and 29 are closed together but, as indicated by the positions of the hook members shown in broken lines, the two arms can be brought further together in overlapping relation and will be so brought together when in engagement with a fishing pole, which fishing pole is generally designated P. It is apparent in Figs. 2 and 4 that the outward force exerted by the leaning pole on the two hooks 28 and 29 will tend to hold the two hooks in their fully closed overlapping positions by virtue of the curvature of the portions of the hooks in contact with the pole. Thus it is contemplated that the normal position of the ring member 33 will be the full line position in Fig. 4, but the ring member will be moved forward to the position shown in broken lines when the two arms are further closed to their overlapping position. If desired, the two arms may be biased to take the fully closed overlapping position with the ring member 33 in its maximum forward position but biasing of the two arms to lesser degree, as shown, to merely close the two hook members together is preferred.

The manner in which the device serves its purpose is apparent from the foregoing description. The fisherman wears the base member 10 on his belt and whenever desired seats the butt end of the pole P in the socket member 12 and engages the pole with the two hooks 28 and 29 at the ends of the two arms 25 and 26. To open the two arms to receive the pole P the user merely slides the ring member 33 rearward towards the base member 10. After passing the pole through the two hooks P the user then slides the ring member 33 forward to the position shown in dotted lines in Fig. 4 and then releases the ring member. The weight of the pole applied forwardly to the two hooks 28 and 29 will then maintain the hooks in their fully closed overlapping positions.

By virtue of the hinge construction that mounts the two arms 25 and 26 pivotally on the base member 10, the two arms will resist any tendency of the fishing pole to swing laterally about its support axis in socket member 12. Thus the device frees both of the hands of the fisherman during waiting periods and, in addition, serves as an aid for holding the pole in the active periods of playing and landing fish.

My description in specific detail of a selected embodiment of the invention set forth herein by way of example and to illustrate the principles involved will suggest various changes, substitutions and other departures from my disclosure that properly lie within the spirit and scope of the appended claims.

We claim:

1. In a device of the character described to support a fishing pole from a fisherman's belt, the combination of: a base member; means to attach said base member to the fisherman's belt; socket means on said base member to seat the butt end of the fishing pole; means for releasable engagement with the fishing pole at a point spaced from said butt end to connect the fishing pole with the base member above said socket means, said releasable means being dimensioned in length to hold said fishing pole in a position outwardly inclined from the base member, said releasable means being connected to said base member by a hinge construction that substantially confines the movement of the releasable means to an arcuate path in a substantially vertical plane whereby said releasable means resists lateral movement of the fishing pole relative to said socket means, said releasable means comprising a pair of spring wire arms extending forward from spaced points on said hinge construction, said arms crossing each other and being bent at their outer ends to form two corresponding co-engaging hooks, said hooks being turned towards each other to engage the fishing pole in overlapping relation from opposite sides of the fishing pole; and a ring member embracing said arms in the region of their intersection, said ring member being manually slidable inward along the two arms to cause said hooks to spread apart to receive said fishing pole.

2. A device as set forth in claim 1 in which said two arms are biased to draw said two hooks together and to normally position said ring member at a relatively forward position on the two arms.

3. In a device of the character described to support a fishing pole from a fisherman's belt, the combination of: a relatively rigid base member to be worn in upright position by the fisherman; means at the upper end of said base member forming a loop to receive the fisherman's belt for support of the base member; socket means on said base member to seat the butt end of the fishing pole; and means for releasable engagement with the fishing pole at a point spaced from the butt end of the fishing pole to hold the pole in said socket at the position inclined outwardly from said base member, said releasable means being mounted on said base member by a pivotal engagement with said loop means, said loop means being a piece of sheet material attached at one end to the back of said base member and attached at the other end to the front of the base member, said piece of sheet material being folded over the top of the base member to form a loop rearward of the base member to receive the belt and a loop forward of the base member for engagement by said releasable means.

4. A device as set forth in claim 3 in which said releasable means comprises spring wire means having a portion looping through said loop forward of the base member formed by said folded piece of sheet material.

References Cited in the file of this patent

UNITED STATES PATENTS

| 1,786,254 | Meehan | Dec. 23, 1930 |
| 2,068,054 | Haislip | Jan. 19, 1937 |
| 2,271,136 | Geiger | Jan. 27, 1942 |
| 2,576,624 | Miller | Nov. 27, 1951 |

FOREIGN PATENTS

| 10,333 | Great Britain | July 15, 1915 |